United States Patent
Scali et al.

(10) Patent No.: US 11,516,185 B2
(45) Date of Patent: Nov. 29, 2022

(54) METHODS, SYSTEMS, AND COMPUTER READABLE MEDIA FOR ENABLING CLOUD-BASED MANAGEMENT SERVICES USING AN ON-SII E MANAGEMENT CLOUD ENGINE

(71) Applicant: Oracle International Corporation, Redwood Shores, CA (US)

(72) Inventors: James Lawrence Scali, Hollis, NH (US); Gary Michael Lorkiewicz, Sutton, MA (US); Robert Hugh Holt, Amherst, NH (US); Gregory Thomas Deubler, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/200,778

(22) Filed: Mar. 13, 2021

(65) Prior Publication Data
US 2022/0294767 A1 Sep. 15, 2022

(51) Int. Cl.
*H04L 9/40* (2022.01)
*G06F 9/54* (2006.01)
(Continued)

(52) U.S. Cl.
CPC ............ *H04L 63/04* (2013.01); *G06F 9/541* (2013.01); *H04L 63/10* (2013.01); *H04L 67/10* (2013.01); *H04L 67/141* (2013.01); *H04L 69/08* (2013.01)

(58) Field of Classification Search
CPC ......... H04L 63/04; H04L 63/10; H04L 67/10; H04L 67/141; H04L 69/08; G06F 9/541
See application file for complete search history.

(56) References Cited

U.S. PATENT DOCUMENTS 9,917,888 B1 * 3/2018 Bonagiri ............... H04L 41/024
2016/0226913 A1 * 8/2016 Sood .................... H04L 63/1425
(Continued)

FOREIGN PATENT DOCUMENTS

EP     3 531 624 A1     8/2019

OTHER PUBLICATIONS

Notification of Transmittal of the International Search Report and the Written Opinion of the International Searching Authority, or the Declaration for International Application No. PCT/US2022/019849 (dated May 30, 2022).

*Primary Examiner* — El Hadji M Sall
(74) *Attorney, Agent, or Firm* — Jenkins, Wilson, Taylor & Hunt, P.A.

(57) ABSTRACT

A method for enabling cloud-based management services using an on-site management cloud engine includes establishing a single secure communication channel between a management cloud engine (MCE) located in a customer premises and a cloud management services platform located in a cloud computing infrastructure, receiving, by the MCE from a unified management service (UMS) manager located in the cloud management services platform, a management instruction message directed to at least one network function located in the customer premises via the single secure communication channel, converting instruction data contained in the management instruction message to a legacy protocol recognized by the at least one network function, and providing the converted instruction data to the at least one network function.

20 Claims, 4 Drawing Sheets

(51) Int. Cl.
*H04L 67/141* (2022.01)
*H04L 69/08* (2022.01)
*H04L 67/10* (2022.01)

(56) References Cited

U.S. PATENT DOCUMENTS

| | | | |
|---|---|---|---|
| 2016/0373474 A1* | 12/2016 | Sood | G06F 21/50 |
| 2018/0109563 A1 | 4/2018 | Stainback et al. | |
| 2018/0329693 A1* | 11/2018 | Eksten | G06F 8/65 |
| 2020/0014555 A1 | 1/2020 | Subbarao et al. | |
| 2020/0252475 A1* | 8/2020 | Marndi | G06F 9/45558 |

* cited by examiner

METHODS, SYSTEMS, AND COMPUTER READABLE MEDIA FOR ENABLING CLOUD-BASED MANAGEMENT SERVICES USING AN ON-SII E MANAGEMENT CLOUD ENGINE

TECHNICAL FIELD

The subject matter described herein relates to cloud-based management of network functions located at an on-site customer location. More particularly, the subject matter described herein relates to methods, systems, and computer readable media for enabling cloud-based management services using an on-site management cloud engine.

BACKGROUND

The management and monitoring of network functions (NFs) located a customer premises is traditionally conducted by an element management system (EMS) that is similarly deployed directly on the customer's remote site. While communications between the EMS and the managed network functions is easily secured, this management solution is not extremely scalable as the number of supported network functions increases. Moreover, network functions residing at a local customer premises are not well-suited to support the stringent requirements of cloud management and cloud-based monitoring services that are situated outside of the customer's remote site. Legacy protocols such as, as simple network management protocol (SNMP), secure shell (SSH) protocol, SSH file transfer protocol (SFTP), and acme control protocol (ACP) do not lend themselves to be compatible communication channels that can be readily established between the customer premises and a cloud computing infrastructure. Moreover, the varying characteristics of the disparate network functions supported at a remote site do not permit a scalable or consistent "cloud-to-ground" solution in many instances. Problems that arise in these scenarios further include i) legacy application programming interface (API) requirements where the network functions expose different APIs and workflows, ii) communication overload in both northbound communications from cloud SaaS entities and southbound communications related to SNMP trap storms generated by network functions and iii) unsafe management of a multitude of communication channels, especially when the cloud-based management platform needs to manage thousands of network functions at several remote customer sites.

Accordingly, there exists a need for methods, systems, and computer readable media for enabling cloud-based management services using an on-site management cloud engine.

SUMMARY

The subject matter described herein includes a methods, systems, and computer readable media for enabling cloud-based management services using an on-site management cloud engine. One method includes establishing a single secure communication channel between a management cloud engine (MCE) located in a customer premises and a cloud management services platform located in a cloud computing infrastructure, receiving, by the MCE from a unified management service (UMS) manager located in the cloud management services platform, a management instruction message directed to at least one network function located in the customer premises via the single secure communication channel, converting instruction data contained in the management instruction message to a legacy protocol recognized by the at least one network function, and providing the converted instruction data to the at least one network function.

In one example of the method, a local customer cloud service (CCS) entity located in the customer premises is configured to establish the single secure communication channel with a corresponding CCS agent located in the cloud management services platform.

In one example of the method, the single secure communication channel includes a representation state transfer (REST) application programming interface (API).

In one example of the method, the MCE is configured to receive and aggregate SNMP traps that are directed to the cloud management services platform from a plurality of network functions operating in the customer premises.

In one example of the method, the MCE is configured to perform a rate limiting function on messages that are sent to the cloud management services platform from the at least one network function.

In one example of the method, the MCE includes a plurality of device adapters that are respectively configured to convert the management instruction messages into a legacy protocol that is respectively recognized by at least one network function.

In one example of the method, the management instruction message includes a network function configuration query, a network function polling query, or a network function command that is contained in a REST API message.

A system for enabling cloud-based management services using an on-site management cloud a cloud computing infrastructure supporting a cloud management services platform includes a local CCS entity that is stored in memory of a customer premises computing device and when executed the processor of the customer premises computing device is configured to establish a single secure communication channel between the customer premises computing device and the cloud management services platform. The system also includes a MCE entity that is stored in the memory of the customer premises computing device and when executed the processor is configured to receive, from a UMS manager located in the cloud management services platform, a management instruction message directed to at least one network function located in the customer premises via the single secure communication channel, converting instruction data contained in the management instruction message to a legacy protocol recognized by the at least one network function, and providing the converted instruction data to the at least one network function.

In one example of the system, the local CCS entity located in the customer premises is configured to establish the single secure communication channel with a corresponding CCS agent located in the cloud management services platform.

In one example of the system, the single secure communication channel includes a REST API.

In one example of the system, the MCE is configured to receive and aggregate SNMP traps that are directed to the cloud management services platform from a plurality of network functions operating in the customer premises.

In one example of the system, the MCE is configured to perform a rate limiting function on messages that are sent to the cloud management services platform from the at least one network function.

In one example of the system, the MCE includes a plurality of device adapters that are respectively configured to convert the management instruction messages into a legacy protocol that is respectively recognized by the at least one network function.

In one example of the system, the management instruction message includes a network function configuration query, a network function polling query, or a network function command that is contained in a REST API message.

The subject matter described herein may be implemented in hardware, software, firmware, or any combination thereof. As such, the terms "function" "node" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Methods, systems, and computer readable media for enabling cloud-based management services using an on-site management cloud engine are disclosed. In some embodiments, the disclosed subject matter includes a management cloud engine (MCE) that is positioned locally at a customer premises site and/or network. In particular, the management cloud engine serves as a local management element that serves as the client component of a cloud management services platform (e.g., a session delivery management cloud) hosted in a cloud computing infrastructure. In some embodiments, the management cloud engine serves as a protocol translator for communications conducted between network functions supported at the customer premises ("on-the ground" remote site) and the cloud management services platform that is supported by the cloud computing infrastructure. In particular, the cloud management services platform communicates management instructions (e.g., commands and/or queries) to the hosted network functions via the management cloud engine. Likewise, the network functions can communicate alerts and other status or configuration information to the cloud management services platform via the management cloud engine (e.g., via a single secure channel). In some embodiments, the management cloud engine is equipped with network function device adapters that are configured to convert REST message instructions from the cloud management services platform into compatible management messages that can be recognized and processed by the respective network functions positioned at the customer premises.

In some embodiments, the management cloud engine also provides throttling (e.g., rate limiting) functionality for message traffic received from both the network functions and the cloud management services platform. For example, the management cloud engine may receive a plurality of SNMP trap messages from one or more supported network functions. In the event an SNMP trap storm occurs, the management cloud engine can utilize a throttling manager to implement different throttling management techniques that rate limit the number of SNMP traps and/or alerts that are forwarded to the cloud management services platform. Presented below are descriptions of example embodiments of the disclosed subject matter.

Figure 1:
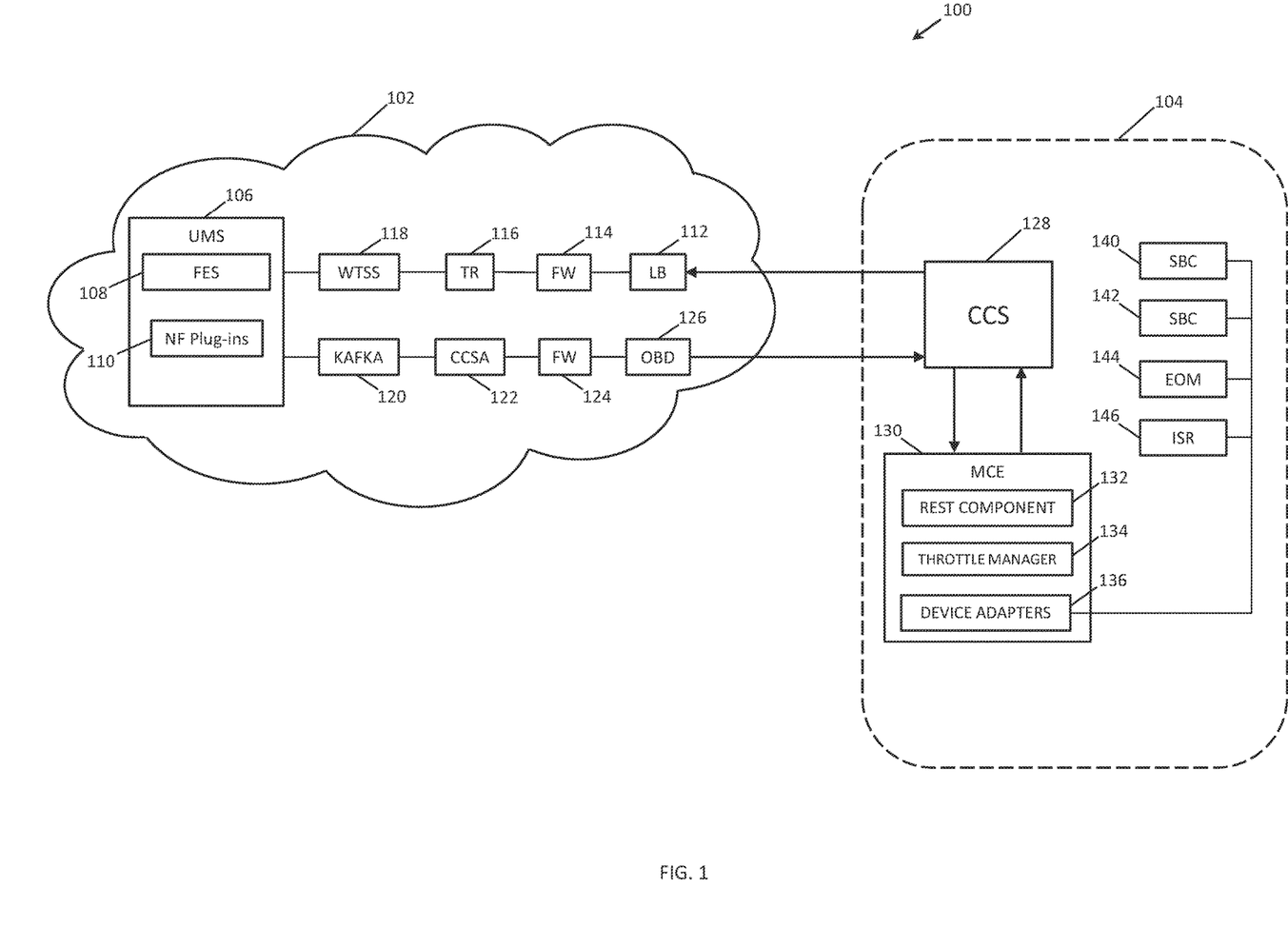
FIG. 1 is a block diagram illustrating an exemplary communications network including a cloud-based management services infrastructure and an on-site management cloud engine according to an embodiment of the subject matter described herein.

FIG. 1 is a block diagram illustrating an exemplary communications network for enabling cloud-based management services using an on-site management cloud engine according to an embodiment of the subject matter described herein. For example, FIG. 1 depicts a communications network 100 that includes a cloud management services platform 102 and at least one customer premises 104. As used herein, customer premises 104 may include any subscriber premises, network, and/or networking environment (e.g., a subscriber's local area network, a subscriber's wide area network, and other similar area networks) that utilizes customer premises equipment to connect to a telecommunications circuit (e.g., the public Internet). Although one customer premises is depicted in FIG. 1, additional customer premises instances can be supported by cloud management services platform 102 without departing from the scope of the disclosed subject matter. Cloud management services platform 102 may include any cloud management services platform that is configured to provide session delivery management services to one or more customer premises 104. Although not shown in FIG. 1, cloud management services platform 102 may be supported by an underlying cloud computing infrastructure (e.g., Oracle Computing Infrastructure (OCI)).

FIG. 1 illustrates the placement of the management intelligence plane in a cloud computing infrastructure (and/or cloud management services platform 102) such that a customer network operator is not required to implement a standalone management service intelligence system at each customer remote site (e.g., customer premises 104). Notably, the management service intelligence is centralized in cloud management services platform 102, which in turn is configured to securely establish communication channels with local management clients (i.e., management cloud engine 130) residing in the supported customer premises in a non-intrusive manner. In particular, placement of the management intelligence into the cloud will not impact the network functions or their functionality within the customer premises. Instead, the system depicted in FIG. 1 affords a secure and centralized solution for managing a multitude of network functions operating at disparate remote sites in accordance with their respective proprietary protocols (e.g., ACP, TLS, SNMP, SFTP, etc.). Notably, these proprietary or legacy protocols (i.e., native protocol languages) are not constructed for secure transmission across the public Internet or to enter a cloud management services platform or infrastructure that is primarily configured to communicate via a single source protocol.

As shown in FIG. 1, cloud management services platform 102 includes a unified management service (UMS) manager 106, a web tier security server (WTSS) 118, a tenant router 116, an ingress firewall 114, a load balancer component 112, a KAFKA element 120, a CCSA, an egress firewall 124, and an outbound proxy element 126. In some embodiments, KAFKA element 120 serves as a messaging service supporting producer/consumer pattern to provide decoupled communication between micro-services. In one example use case, UMS manager 106 can produce messages (i.e., requests that need to be delivered to a management cloud engine) which KAFKA element 120 can deliver to any micro-service that is registered as a consumer (i.e. in this scenario, CCS agent 122 is registered as a consumer). In a second example use case, CCS agent 122 can produce messages (i.e., responses from a management cloud engine that needs to be delivered to UMS manager 106) which KAFKA element 120 can deliver to any micro-service that is registered as a consumer (i.e., in this scenario, UMS manager 106 is registered as a consumer).

In some embodiments, cloud management services platform 102 is configured to communicate in a single protocol, such as a REST API communication protocol. Accordingly, cloud management services platform 102 can generate and convey management instruction messages (e.g., management commands or queries) to service producer network functions residing in a plurality of customer premises 104. Notably, cloud management services platform 102 is configured to utilize, via the public Internet, a local management cloud engine that operates as a proxy and/or translator for the network functions on behalf of the cloud management services platform. Such a system configuration permits the service producer network functions to be centrally and securely managed by a cloud management service that relies on local management cloud engines to handle the conversion of command/instruction information into a compatible format for the network functions.

In some embodiments, cloud management services platform 102 can include any cloud software as a service (SaaS) that provides management instructions (e.g., queries and/or commands) to network functions hosted at a remote customer premises (e.g., customer premises 104). As indicated above, cloud management services platform 102 includes UMS manager 106, which is configured to utilize a secure communications channel to communicate with the management cloud engine 130 in customer premises 104. For example, UMS manager 106 (e.g., with the assistance of a CCS agent 122) can establish an egress communication path (e.g., cloud-to-ground) by which UMS manager 106 can send management commands or instructions to customer premises 104. More specifically, UMS manager 106 can send commands or instructions to network functions 140-146 in customer premises 104 via the egress communication path. Moreover, these management commands or instructions can be sent to customer premises 104 by UMS manager 106 in either an asynchronous or a synchronous manner.

In some embodiments, UMS manager 106 is equipped with a front end server (FES) component 108. Notably, FES component 108 may be a microservice that is responsible for listening for requests received by cloud management service platform 102. Specifically, FES component 108 is the destination endpoint in UMS manager 106 when a management cloud engine sends a request up to the cloud (i.e., platform 102).

In some embodiments, UMS manager 106 may utilize a NF plug-in element 110 that is designated for and/or corresponds to a particular network function hosted at customer premises 104 in order to generate a management command or query for that particular network function. Such a management command may include a REST message that includes an NF configuration request for session border controller (SBC) NF 140. Moreover, NF plug-in element 110 may direct the command message to an Internet protocol (IP) address corresponding to a specific network function (and/or its associated device adapter) that is hosted at customer premises 104. Notably, each NF plug-in element 110 supported by UMS manager 106 is associated with a unique device adapter 136 supported at the management cloud engine 130 (as described in greater detail below).

In some embodiments, when UMS manager 106 needs to communicate with a particular network function at a serviced customer premises, UMS manager 106 may access a database structure (not shown) that maps its local NF plug-in elements 110 with the network functions supported at the customer premises. After identifying the appropriate NF plug-in element 110, UMS manager instructs NF plug-in element 110 to generate and send a management instruction message (e.g., a configuration query message, a KPI polling message, a network function command message) to the appropriate network function at the customer premises 104. In some embodiments, the management command message may comprise a configuration query message that is directed to the either a network function supported at a remote site or a corresponding device adapter of the network function supported at the local management cloud engine. In some embodiments, the query portion of the management instruction message is contained in the payload section of a REST API message generated by the NF plug-in element 110.

Moreover, the REST management instruction message can be communicated through the cloud management services platform's egress communications path, which can be facilitated by a KAFKA element 120, a CCS agent 122, an egress firewall 124, and an outbound proxy element 126 (e.g., an HTTP proxy element). In particular, the REST management instruction message is sent by outbound proxy element 126 to CCS entity 128 for delivery to the IP address of network function (e.g., SBC NF 140). Additional detail of cloud-based management instructions and commands being processed at customer premises 104 is described below.

In some embodiments, cloud management services platform 102 and/or UMS manager 106 is configured to establish an ingress communication path within cloud management services platform 102. In particular, a load balancer component 112 can be configured to receive a REST message sent by management cloud engine 130 via CCS entity 128 in customer premises 104. In some embodiments, the received REST message can include a management response message to a management request (e.g., NF configuration request) that was originally sent by UMS manager 106. Likewise, the REST message may include a SNMP trap collection message (e.g., a message containing a collection of trap data, alarm data, and/or event information) that has been generated and sent by management cloud engine 130. Alternatively, the REST message may include an authentication message, a registration message, and/or a file transfer message (e.g., upload/download files) that is transmitted by management cloud engine 130 on behalf of network functions 140-146 or itself.

As described in greater detail below, load balancer component 112 may receive a REST message sent via a single pinhole or port of a firewall (not shown) located in customer premises 104 and associated with CCS entity 128. After receiving the REST message, load balancer component 112 may forward the REST message to UMS manager 106 over the ingress communication channel comprising tenant router 116 and WTSS 118. More specifically, load balancer component 112 (and/or ingress firewall 114) can forward the REST message to an appropriate tenant router 116. In some embodiments, the tenant router component 116 can inspect and determine the particular Tenant space destination and forwards the REST request to the appropriate Tenant Web Tier Security Service (WTSS) 118, which then forwards the request to the Unified Management Service (UMS) 106 supported by cloud management services platform 102 that serves a particular customer premises 104. For example, WTSS 118 and UMS 106 are associated with customer premises 104. More specifically, cloud management services platform 102 includes a plurality of tenant spaces that corresponds to a respective plurality of customer premises. Once received by the appropriate WTSS 118, the REST message is forwarded to UMS manager 106 via WTSS 118 for appropriate processing and data collection.

In some embodiments, a network operator can generate a NF plug-in that is subsequently provisioned on UMS manager 106. Likewise, the network operator can generate a corresponding NF device adapter 136 that is delivered and provisioned on management cloud engine 130. By constructing "NF plug-in and NF device adapter pairs" in this manner, the cloud-based management solution afforded by the disclosed subject matter is highly scalable and non-intrusive since the core functionality of the system is unchanged. Notably, cloud management services platform 102 can manage any type of network function even if said network function has unfamiliar characteristics since any management nuances that are inherent to the network function can be addressed by the unique device adapter provisioned at the local management cloud engine.

As shown in FIG. 1, cloud management services platform 102 is communicatively connected to at least one customer premises 104. In some embodiments, a customer premises 104 includes a CCS entity 128, at least one management cloud engine (MCE) 130, and a plurality of service producer network functions 140-146. Although only four service producer network functions are shown in FIG. 1, additional service producer network functions may be supported by management cloud engine 130 and/or customer premises 104 without departing from the scope of the disclosed subject matter. Further, although only SBC network functions 140-142, an enterprise output management (EOM) network function 144, and an integrated service router (ISR) network function 146 are shown in FIG. 1, other microservice network functions can be utilized and/or supported without departing from the scope of the disclosed subject matter.

Management cloud engine 130 is a local element positioned within the customer premises 104 that serves as a protocol converter between network functions 140-146 and UMS manager 106 in the cloud management services platform 102. In some embodiments, management cloud engine 130 includes a Docker container that can run in a virtual machine that is stored in memory and executed by a processor of a customer premises computing device (e.g., an MCE computing device). Likewise, CCS entity 128 may be stored in its own Docker container running on a virtual machine (e.g., CCS container) that is stored in the same or similar customer premises computing device.

For example, CCS entity 128 may be stored in a CCS container that is used by a customer premises computing device to facilitate secure communications with cloud management services platform 102. In particular, CCS entity 128 is utilized because secure communications needs to be conducted over a public Internet. In order to securely conduct communications between a cloud management services platform 102 and a plurality of customer premises over a public network, each customer premises will require a component such as CCS entity 128. Notably, CCS entity 128 functions as a secure proxy element that is configured to establish a single secure connection with a corresponding customer cloud service agent (e.g., CCS agent) provisioned in the cloud infrastructure. For example, cloud management services platform 102 includes a CCS agent 122 for each CCS entity 128 (and remote customer premises 104) that cloud management services platform 102 supports. Specifically, CCS agent 122 and CCS entity 128 establish a communication session and create a secure proxy session over the public Internet using HTTPS and/or TLS between the cloud management services platform 102 and the customer premises 104. Notably, CCS entity 128 does not process any of the information contained in the communications, but instead only establishes secure circuit connections from the cloud management service platform to the remote customer site. CCS entity 128 is thus configured to forward the received management information to management cloud engine 130. As such, management cloud engine 130 is the local entity responsible for processing and interrogating information contained in the communications between cloud management services platform 102 and customer premises 104.

Although not explicitly shown in FIG. 1, CCS entity 128 is positioned in a "demilitarized" zone (DMZ) of the customer premises. In some embodiments, a firewall element (not shown) is positioned between CCS entity 128 and management cloud engine 130. Moreover, there is another firewall element that may be positioned in front of CCS entity 128 such that all communications entering the customer premises will traverse the firewall element before being received at CCS entity 128. In some embodiments, CCS entity 128 is configured to open a single channel, port, or pinhole in this firewall element in order to facilitate the secure communication with cloud management services platform 102. Notably, CCS entity 128 avoids opening a channel, port, or pinhole for each of the network functions hosted at the customer premises (e.g., 100 ports for 100 SBCs). Accordingly, overall security for the communications conducted between the customer premises 104 and the cloud management services platform 102 is enhanced by way of a single secure pinhole managed by CCS entity 128.

As indicated above, management cloud engine 130 may function as a secure session component that services both the "cloud-to-ground" communication requirements and the "ground-to-cloud" communication requirements in such a manner that permits a significant portion of session delivery management functionality to be abstracted away from the requirements of managing communications to local network functions. In particular, transactions for northbound communications (i.e., messaging between the cloud platform and the MCE) are completely separated from the transactions of southbound communications (i.e., messaging between the MCE and the network functions at the customer premises).

As described in greater detail below, each separate service producer network function supported at the remote site has its own dedicated device adapter within the management cloud engine 130. Notably, a supported device adapter handles conversion of commands and payloads for each protocol the network function uses to communicate. As such, this layer of abstraction i.e., device adapters) permits any network function to be supported by the MCE regardless of what API protocol that network function typically utilizes.

In some embodiments, management cloud engine 130 operates as a secure protocol converter that allows payloads and messages of cloud-based communications to be converted into the legacy protocols and/or the native protocol languages (e.g., ACP/TLS, SNMP, SFTP, SSH, REST, etc.) that the local network functions require for operation. For northbound communication, i.e., communication conducted between cloud management services platform 102 and customer premises 104 (and/or management cloud engine 130), management cloud engine 130 can function as a server that is configured to receive commands or instructions from cloud management services platform 102 and/or UMS manager 106. Namely, management cloud engine 130 allows cloud management services platform 102 to securely communicate with network functions hosted at remote sites, such as an on-site customer premises or even other cloud systems.

In some embodiments, management cloud engine 130 comprises software may be packaged in a docker container for ease of deployment at the customer remote site. In addition, management cloud engine 130 may also be embodied as a Web server that supports servlet containers. Management cloud engine 130 can be equipped with a REST component 132 that may be configured to initiate secure communication from customer premises 104 to UMS manager 106 in the cloud management services platform 102. As shown in FIG. 1, management cloud engine 130 includes a REST component 132, a throttling manager 134, and a plurality of device adapters 136. Notably, the device adapter framework in the management cloud engine (e.g., network function device adapters 136) provides interfaces in which new producer network functions can use to create their own device adapters. In some embodiments, management cloud engine 130 may utilize device adapters 136 to forward management instruction messages from the cloud management services platform to the intended network functions 140-146. For example, management cloud engine 130 is configured to parse and inspect the payload of the received management instruction messages in order to determine which device adapter 136 (and/or associated network function) is the intended recipient. In some embodiments, management cloud engine 130 maintains a list that maps the IP address of network functions 140-146 to the supported device adapters 136. This list is provided by the UMS service 106 as part of its instructions on which devices each management cloud engine 130 instance is responsible for.

Upon receiving the management message, device adapter 136 and/or management cloud engine 130 is configured to convert the message from the REST protocol into a designated legacy protocol (e.g., ACP, SNMP, etc.) that is compatible and understandable by the intended network function. After receiving the converted message from device adapter 136, the network function may generate a management response message (e.g., a configuration response message, a polling response message, a status update response message, etc.) that includes pertinent information in the payload of a management response message formatted in the related legacy protocol. Notably, device adapter 136 receives and converts the management response message into a REST message that includes a payload of the requested management data (e.g., requested configuration information, requested polling data, etc.).

In some embodiments, management cloud engine 130 may utilize device adapters to receive and process messages containing or pertaining to SNMP traps and SNMP trap storms. In some embodiments, a device adapter 136 is configured to detect the IP address of the reporting network function in the SNMP trap message (e.g., parse the SNMP trap). This SNMP trap information may then be stored by the device adapter in a local cache (not shown) of the management cloud engine 130. After receiving a predefined number of SNMP trap messages and/or after a predefined time period, management cloud engine 130 can aggregate a number of traps/alerts stored in the cache and converts the data into a REST protocol. Management cloud engine 130 generates a REST response message that is forwarded to CCS entity 128 for delivery to cloud management services platform 102.

In some embodiments, management cloud engine 130 provides a northbound REST API. Notably, REST component 132 can be used by cloud management services platform 102 to directly communicate with management cloud engine 130. In particular, management cloud engine 130 functions as a central hub of the customer premises and can receive and subsequently deliver cloud-based instructions and commands to network functions 140-146. In some embodiments, management cloud engine 130 is configured to manage the connections to each of the network functions. Notably such connection management is conducted in such a manner that management cloud engine 130 remains non-intrusive and not consume resources that the network functions require. As stated above, management cloud engine 130 may function as a secure protocol converter that permits cloud-based communications to be converted into the legacy protocols that recognized by a customer's on-site network functions.

For southbound communications (i.e., communication conducted between a management cloud engine and on-site network functions), management cloud engine 130 may initiate secure communication sessions with network functions 140-146. Likewise, management cloud engine 130 can also be configured to receive secure SNMP traps from network functions 140-146. Notably, management cloud engine 130 can be configured to convert the received SNMP traps or alerts from legacy protocols into events that are ultimately sent to cloud management services platform 102 in a REST message. Further, southbound communications legacy protocols are supported by device adapters 136 that are integrated in management cloud engine 130 for each type of network function product.

As indicated above, management cloud engine 130 may utilize a different device adapter 136 for each separate producer network function 140-146 (e.g., SBC network functions, enterprise output management (EOM) network functions, integrated service router (ISR) network functions, and the like) for southbound communications. As such, each device adapter 136 contains isolated characteristics that are needed for management cloud engine 130 to convert the cloud communications to legacy protocols for each network function. For example, device adapters 136 may convert the REST request message that is received from the cloud management services platform 102 into the specific protocols that the network functions understand.

Furthermore, management cloud engine 130 can also function as a client entity that pushes or forwards alarms converted from network function SNMP traps received from the producer network functions 140-146. In some embodiments, management cloud engine 130 is configured to function as an SNMP trap receiver for each product network function 140-146. In particular, management cloud engine 130 can convert the receive SNMP traps into a REST message or payload that can be directed to the cloud management services platform 102 via the CCS entity 128.

As indicated above, management cloud engine 130 further includes a throttling mechanism (e.g., throttling manager 134) that can deal with SNMP trap storms. In some embodiments, management cloud engine 130 may be configured to receive a plurality of SNMP traps generated by SBC network functions in any scenario. For example, if a DNS service server supporting the SBC network functions (e.g., SBC NF 140-142) hosted at the customer premises fails, each of the SBC network functions will generate a SNMP trap that is directed to the cloud management services platform 102 in order to alert the cloud management system of the DNS service server failure. In response to receiving a flood of SNMP traps, management cloud engine 130 and/or throttling manager 134 is configured to determine whether the number of SNMP traps exceeds a threshold number over a designated period of time (e.g., 1000 SNMP traps per second). If the threshold is exceeded, management cloud engine 130 is configured to generate a payload report message containing a predefined number of alert/trap payloads (e.g., 1000 alerts/traps) and discarding any messages exceeding this amount. Notably, management cloud engine 130 is configured to send, via the CCS entity 128, the payload report message containing the alerts/traps over a single secure channel (or port). More specifically, a single channel is significantly easier to secure as opposed to supporting multiple channels (or ports) that are used to communicate with cloud management services platform 102. Moreover, communicating payload report messages in this manner significantly improves the bandwidth capacity available to cloud management services platform 102.

Likewise, management cloud engine 130 can also function as a gateway that ensures that management instructions or inquiry messages originating from cloud management services platform 102 that are directed to network functions 140-146 are rate limited. Notably, management cloud engine 130 and/or throttling manager 134 can manage the network function connections in such a manner that excessive communications received from cloud management services platform 102 are not necessarily immediately delivered to the network functions. Message throttling in this manner by management cloud engine 130 and/or throttling manager 134 may prevent the supported network functions from becoming overwhelmed.

Figure 2:
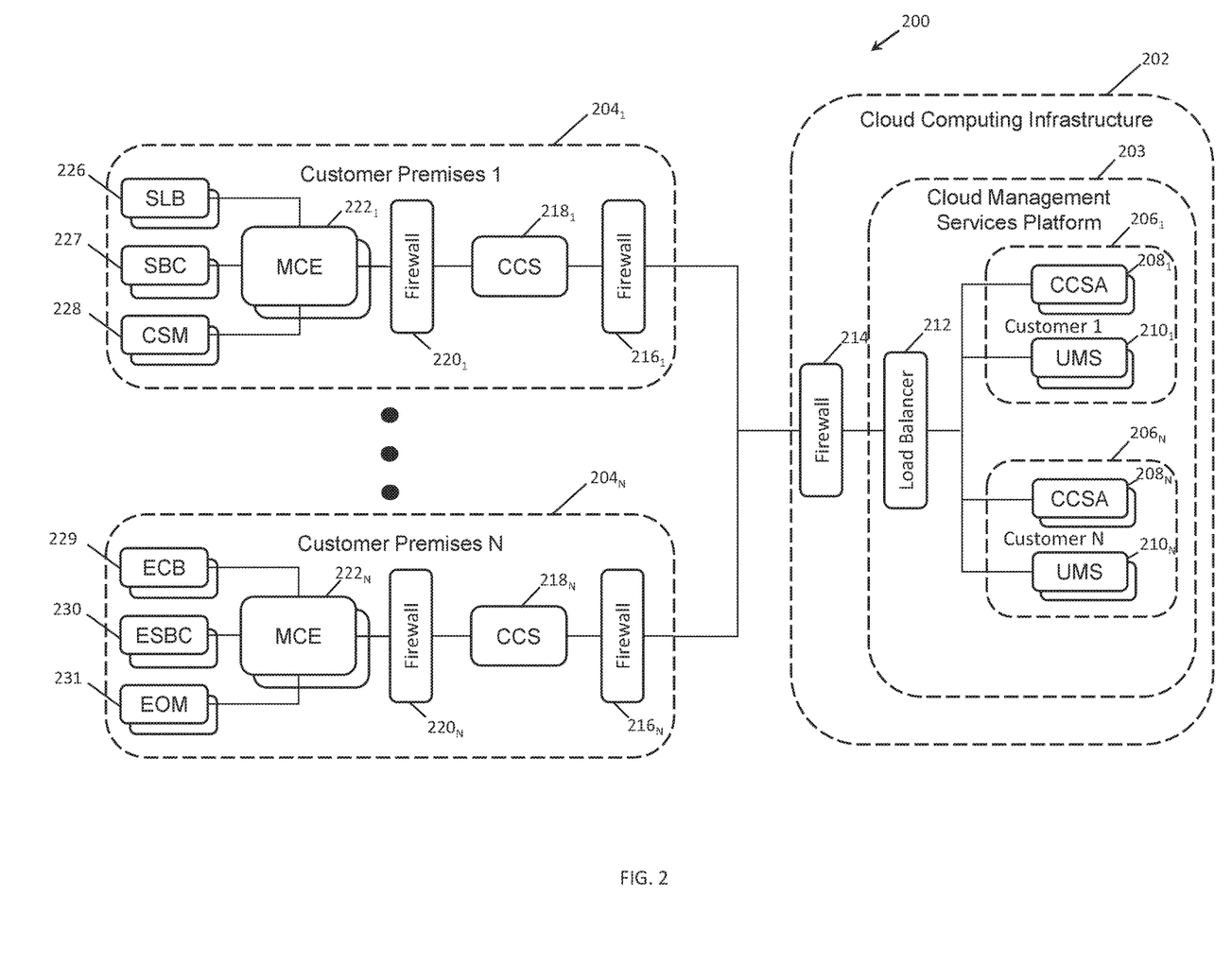
FIG. 2 is a block diagram illustrating, for multiple tenants support, the on-premises component deployment of multiple management cloud engines on each tenant, and their communication to the corresponding tenant space cloud management services platform which provides total customer isolation according to the embodiment of the subject matter described herein.

FIG. 2 is a block diagram illustrating, for multiple tenants support, the on-premises component deployment of multiple management cloud engines on each tenant, and their communication to the corresponding tenant space cloud management services platform which provides total customer isolation according to the embodiment of the subject matter described herein. As shown in FIG. 2, system 200 comprises a cloud computing infrastructure 202 and a plurality of customer premises $204_{1...N}$. in some embodiments, cloud computing infrastructure 202 includes a cloud management services platform 203 that is communicatively connected to each of the customer premises $204_{1...N}$. Cloud management services platform 203 includes a plurality of customer service nodes $206_{1...N}$ that is connected to a load balancer 212 and a firewall element 214, which collectively form a connection to the customer premises $204_{1...N}$. Notably, each customer service node 206 provisioned in cloud management services platform 203 corresponds to a respective customer premises in system 200. More specifically, each of customer service node $206_{1...N}$ includes a CCS agent (e.g., CCS agents $208_{1...N}$) that establishes communication with a CCS entity (e.g., CCS entity $218_{1...N}$) in the customer premises. In some embodiments, CCS entity 218 is a single instance microservice deployed in its own docker container. CCS entity $218_1$ in customer premises $204_1$ may register with CCS agent $208_1$ in the cloud management services platform in order to establish the secure communication between the cloud management services platform 203 and the customer premises $204_1$. In some embodiments, CCS agent 208 is a microservice that is running as part of cloud management services platform 203.

Customer premises $204_1$ further includes multiple management cloud engines $222_1$. As indicated above, each of the multiple management cloud engines provides management and monitoring support for numerous network functions (e.g., network functions 226-231) in a manner that reduces the need for hundreds of communication channels. Instead, management cloud engine 222 is able to employ a single communication channel established between itself and cloud management services platform 203. More specifically, cloud management services platform 203 will only need to manage and monitor a single secure communication channel associated with each management cloud engine $222_{1...N}$ instead of each network function.

As described above with respect to FIG. 1, a management cloud engine is a component that executes the conversion of the proprietary protocols utilized by the producer network functions. For example, the communication protocols utilized by the producer network functions can be converted to a cloud centric REST API based protocol. In some embodiments, management cloud engine $222_1$ is a completely stateless application and is deployed in its own container. Notably, a customer can deploy multiple instances of the management cloud engine in the customer premises. When the management cloud engine 222 registers with the cloud management services platform 203, the UMS 210 is configured to provide each management cloud engine with load balancing instructions for polling events, SNMP trap processing, and network function management.

As shown in FIG. 2, management cloud engine $222_1$ and CCS entity $218_1$ may be separated by a firewall element 220. Similarly, CCS entity $218_1$ is coupled to an ingress firewall element 216 that functions as a gatekeeper responsible for receiving all incoming management instructions or commands from cloud computing infrastructure 202. The management instructions are then forwarded by CCS entity 218 to management cloud engine 222 for distribution to the appropriate network function (as described above with regard to FIG. 1).

Figure 3:
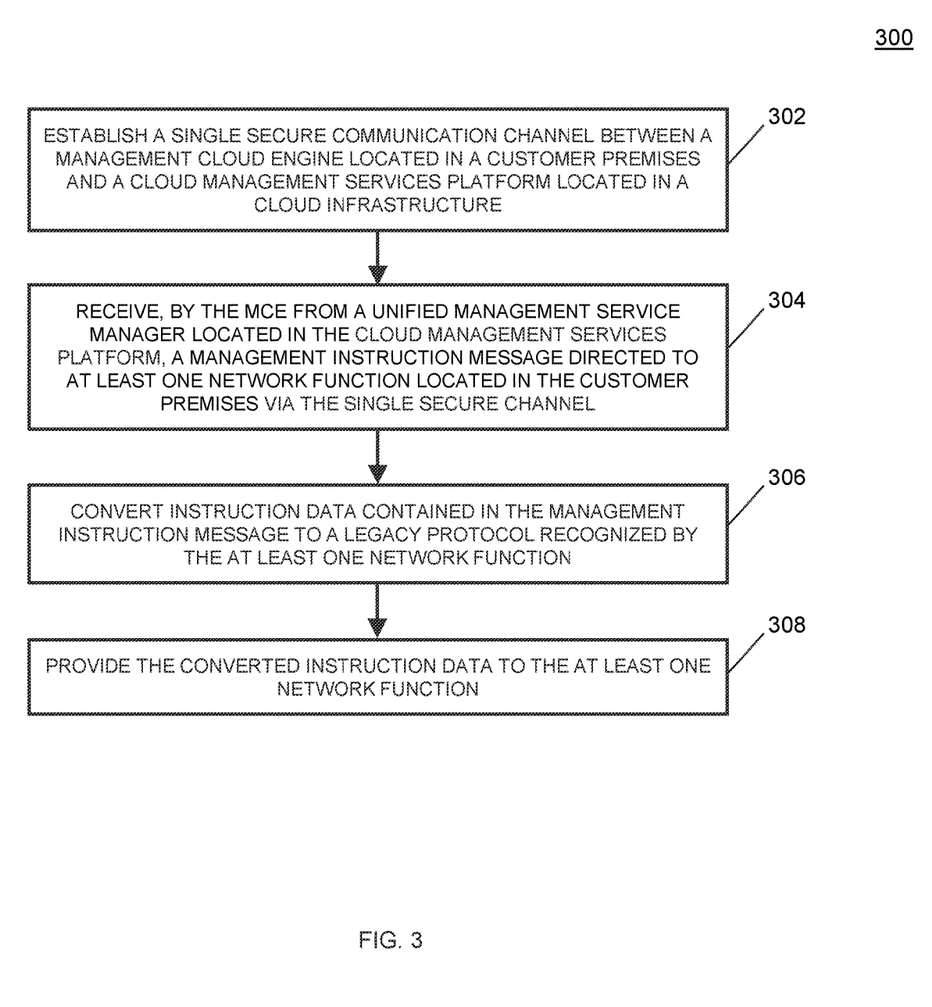
FIG. 3 is a Cloud-to-Ground flow chart illustrating an exemplary process for enabling cloud-based management services using an on-site management cloud engine according to an embodiment of the subject matter described herein.

FIG. 3 is a Cloud-to-Ground flow chart illustrating an exemplary process or method 300 for enabling cloud-based management services using an on-site management cloud engine according to an embodiment of the subject matter described herein. In some embodiments, method 300 as depicted in FIG. 3 is an algorithm stored in memory that when executed by a hardware processor performs one or more of blocks 302-308.

In block 302, a single secure communications channel is established between a management cloud engine located in the customer premises and a cloud management services platform that is located in a cloud computing infrastructure.

In some embodiments, a CCS entity in the customer premises and a CSS agent provisioned in the cloud management services platform establish a secure session connection.

In block 304, the management cloud engine receives from a UMS manager a management instruction message directed to at least one network functions located in the customer premises via the single secure communication channel. In some embodiments, a UMS manager sends a management message requesting configuration data from a network function, such as a session border controller network function, that is operating in a customer premises. Notably, the management cloud engine initially receives the management instruction message on behalf of the network function.

In block 306, instruction in the management instruction message is converted to a legacy protocol that is recognized by the at least one network function. In some embodiments, the management cloud engine is configured to convert the REST-based management request message into a legacy protocol that is recognizable by and compatible with the network function.

In block 308, the converted instruction data is provided to the at least one network function. In some embodiments, the management cloud engine forwards the instruction data, which has been converted into the legacy protocol, to the recipient network function.

Figure 4:
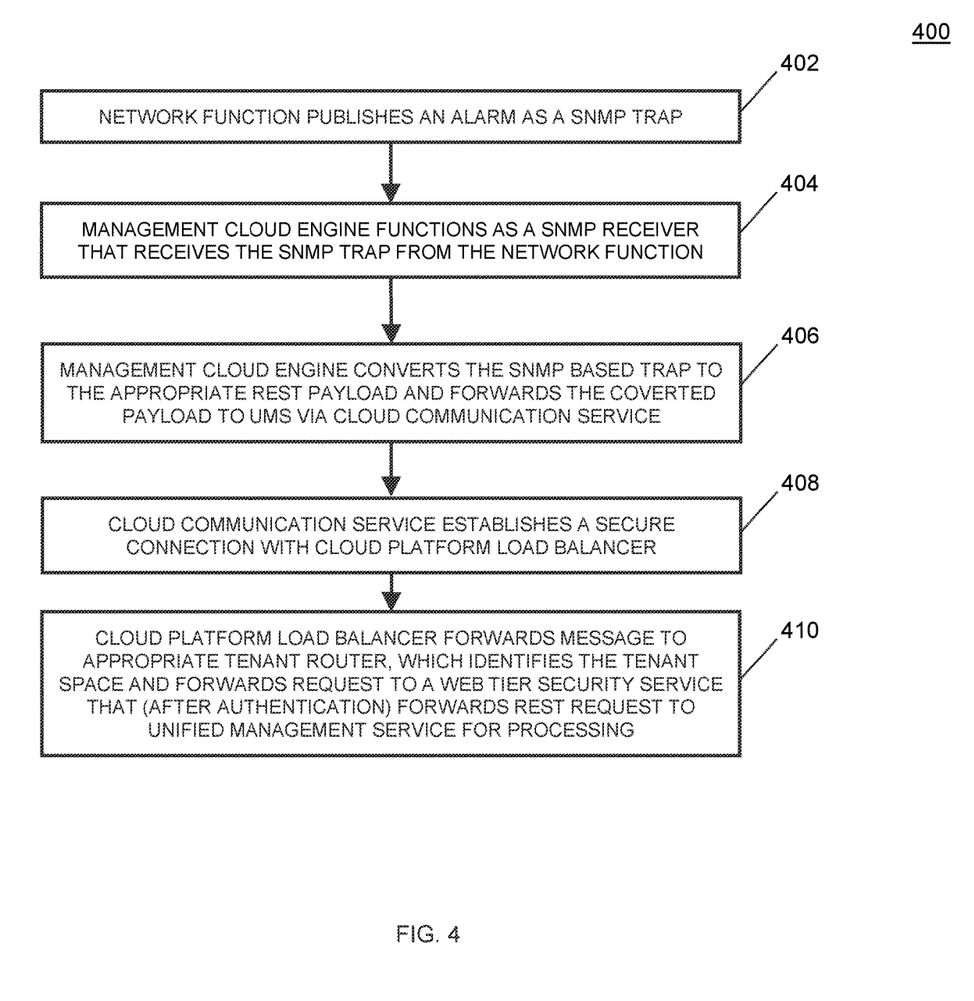
FIG. 4 is a Cloud-to-Ground flow chart illustrating an exemplary process for enabling cloud-based management services using an on-site management cloud engine according to an embodiment of the subject matter described herein.

FIG. 4 is a Ground-to-Cloud flow chart illustrating an exemplary process or method 400 for enabling cloud-based management services using an on-site management cloud engine according to an embodiment of the subject matter described herein. In some embodiments, method 400 as depicted in FIG. 3 is an algorithm stored in memory that when executed by a hardware processor performs one or more of blocks 402-410. For example, FIG. 4 depicts a flow chart pertaining to SBC initiated communication that is directed to the MCE, which converts the legacy protocol from the NF device into a REST payload that is understood by the cloud services (i.e., use-case of NF sending an SNMP trap to MCE where MCE subsequently converts the SNMP trap data to a REST payload and sends the same to the cloud management services platform.

In block 402, a network function publishes an alarm as a SNMP trap. In some embodiments, an SBC network function residing in a customer premises generates a SNMP trap in response to detecting a predefined condition (e.g., ENUM service is unavailable/down). Notably, the SBC network function may send the SNMP trap to the cloud management services platform via the local management cloud engine.

In block 404, the management cloud engine functions as a SNMP receiver that receives the SNMP trap from the network function. As indicated in block 402, the management cloud engine is configured to receive the SNMP trap that is directed to the cloud management services platform. In some embodiments, a device adapter (in the MCE) that is associated with the sending SBC network function is utilized to receive and recognize the SNMP trap in the legacy protocol (e.g., SNMP) used by the sending network function.

In block 406, the management cloud engine converts the SNMP based trap to an appropriate REST payload and forwards the converted payload to UMS via the local CCS component. In some embodiments, the device adapter provisioned in the management cloud engine is configured to convert the received SNMP trap into an appropriate REST payload which notably will be compatible with the UMS manager operating in the cloud management services platform.

In block 408, the cloud communications service establishes a secure connection with the cloud platform load balancer. In some embodiments, the local CCS entity in the customer premises is instructed by the management cloud engine to establish a single secure connection with a load balancer in the cloud management services platform. The local CCS entity may configure a local firewall in the customer premises to open a single channel, port, or pinhole to establish the secure connection with the load balancer.

In block 410, the cloud platform load balancer forwards the received REST message to an appropriate tenant router that identifies the tenant space and forwards a request to a WTSS that, after authentication, forwards a REST request message to the UMS for processing. Notably, each the load balancer, tenant router, and WTSS, and UMS reside in the cloud management services platform.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
   establishing a single secure communication channel between a management cloud engine (MCE) located in a customer premises and a cloud management services platform located in a cloud computing infrastructure;
   receiving, by the MCE from a unified management service (UMS) manager located in the cloud management services platform, a management instruction message directed to at least one network function located in the customer premises via the single secure communication channel;
   converting instruction data contained in the management instruction message to a legacy protocol recognized by the at least one network function; and
   providing the converted instruction data to the at least one network function.

2. The method of claim 1 wherein a local customer cloud service (CCS) entity located in the customer premises is configured to establish the single secure communication channel with a corresponding CCS agent located in the cloud management services platform.

3. The method of claim 1 wherein the single secure communication channel is established via a representation state transfer (REST) application programming interface (API).

4. The method of claim 1 wherein the MCE is configured to receive and aggregate SNMP traps that are directed to the cloud management services platform from a plurality of network functions operating in the customer premises.

5. The method of claim 4 wherein the MCE is configured to perform a rate limiting function on messages that are sent to the cloud management services platform from the plurality of network functions.

6. The method of claim 1 wherein the MCE includes at least one device adapter that is respectively configured to convert the management instruction message into a legacy protocol that is respectively recognized by the at least one network function.

7. The method of claim 1 wherein the management instruction message includes a network function configuration query, a network function polling query, or a network function command that is contained in a representation state transfer (REST) application programming interface (API) message.

8. A system comprising:
a cloud computing infrastructure supporting a cloud management services platform;
a local customer cloud service (CCS) entity that is stored in memory of a customer premises computing device and when executed the processor of the customer premises computing device is configured to establish a single secure communication channel between the customer premises computing device and the cloud management services platform; and
a management cloud engine (MCE) entity that is stored in the memory of the customer premises computing device and when executed the processor is configured to receive, from a unified management service (UMS) manager located in the cloud management services platform, a management instruction message directed to at least one network function located in the customer premises via the single secure communication channel, converting instruction data contained in the management instruction message to a legacy protocol recognized by the at least one network function, and providing the converted instruction data to the at least one network function.

9. The system of claim 8 wherein the local CCS entity located in the customer premises is configured to establish the single secure communication channel with a corresponding CCS agent located in the cloud management services platform.

10. The system of claim 8 wherein the single secure communication channel is established via a representation state transfer (REST) application programming interface (API).

11. The system of claim 8 wherein the MCE is configured to receive and aggregate SNMP traps that are directed to the cloud management services platform from a plurality of network functions operating in the customer premises.

12. The system of claim 11 wherein the MCE is configured to perform a rate limiting function on messages that are sent to the cloud management services platform from the plurality of network functions.

13. The system of claim 8 wherein the MCE includes at least one device adapter that is respectively configured to convert the management instruction message into a legacy protocol that is respectively recognized by the at least one network function.

14. The system of claim 8 wherein the management instruction message includes a network function configuration query, a network function polling query, or a network function command that is contained in a representation state transfer (REST) application programming interface (API) message.

15. A non-transitory computer readable medium having stored thereon executable instructions that when executed by a processor of a computer controls the computer to perform steps comprising:
establishing a single secure communication channel between a management cloud engine (MCE) located in a customer premises and a cloud management services platform located in a cloud computing infrastructure;
receiving, by the MCE from a unified management service (UMS) manager located in the cloud management services platform, a management instruction message directed to at least one network function located in the customer premises via the single secure communication channel;
converting instruction data contained in the management instruction message to a legacy protocol recognized by the at least one network function; and
providing the converted instruction data to the at least one network function.

16. The non-transitory computer readable medium of claim 15 wherein a local customer cloud service (CCS) entity located in the customer premises is configured to establish the single secure communication channel with a corresponding CCS agent located in the cloud management services platform.

17. The non-transitory computer readable medium of claim 15 wherein the single secure communication channel is established via a representation state transfer (REST) application programming interface (API).

18. The non-transitory computer readable medium of claim 15 wherein the MCE is configured to receive and aggregate SNMP traps that are directed to the cloud management services platform from a plurality of network functions operating in the customer premises.

19. The non-transitory computer readable medium of claim 18 wherein the MCE is configured to perform a rate limiting function on messages that are sent to the cloud management services platform from the plurality of network functions.

20. The non-transitory computer readable medium of claim 15 wherein the MCE includes at least one device adapter that is respectively configured to convert the management instruction message into a legacy protocol that is respectively recognized by the at least one network function.

* * * * *

UNITED STATES PATENT AND TRADEMARK OFFICE
CERTIFICATE OF CORRECTION

| | |
|---|---|
| PATENT NO. | : 11,516,185 B2 |
| APPLICATION NO. | : 17/200778 |
| DATED | : November 29, 2022 |
| INVENTOR(S) | : Scali et al. |

It is certified that error appears in the above-identified patent and that said Letters Patent is hereby corrected as shown below:

On the Title Page

Item (54) and in the Specification Column 1 Line 4 delete "ON-SII E" and insert -- ON-SITE --

Signed and Sealed this
Fourth Day of April, 2023

Katherine Kelly Vidal
*Director of the United States Patent and Trademark Office*